United States Patent
Toguchi

(10) Patent No.: US 7,880,802 B2
(45) Date of Patent: Feb. 1, 2011

(54) IMAGING DEVICE AND FOCUS ADJUSTMENT METHOD

(75) Inventor: Masaaki Toguchi, Toyota (JP)

(73) Assignee: Elmo Company, Limited (JP)

( * ) Notice: Subject to any disclaimer, the term of this patent is extended or adjusted under 35 U.S.C. 154(b) by 364 days.

(21) Appl. No.: 11/939,917

(22) Filed: Nov. 14, 2007

(65) Prior Publication Data

US 2008/0165272 A1    Jul. 10, 2008

(30) Foreign Application Priority Data

Jan. 5, 2007    (JP)    ............................. 2007-000458

(51) Int. Cl.
*H04N 5/76* (2006.01)
*H04N 5/232* (2006.01)
*G03B 13/00* (2006.01)
*G03B 17/00* (2006.01)

(52) U.S. Cl. ....................... 348/345; 348/231.6; 396/81

(58) Field of Classification Search ................. 348/345, 348/347–349, 354, 356, 231.3, 231.6; 396/79–82
See application file for complete search history.

(56) References Cited

U.S. PATENT DOCUMENTS

| 6,052,537 A | * | 4/2000 | Sasaki | .......................... 396/103 |
| 7,391,462 B2 | * | 6/2008 | Ike | .............................. 348/347 |
| 2004/0160518 A1 | * | 8/2004 | Park | ...................... 348/207.99 |

FOREIGN PATENT DOCUMENTS

| JP | 1-125065 | 5/1989 |
| JP | 7-87377 | 3/1995 |

* cited by examiner

*Primary Examiner*—Sinh Tran
*Assistant Examiner*—Daniel M Pasiewicz
(74) *Attorney, Agent, or Firm*—Ostrolenk Faber LLP

(57) ABSTRACT

In response to the user's short press of one preset button, a video camera according to one aspect of the invention reads out preset values stored in an EEPROM and adjusts the pan position, the tilt position, the position of a zoom lens, the position of a focus lens based on the read-out preset values. A movable range of the focus lens is restricted to a specific limited range between a closer direction end and a background position as a previously focused position. Hill-climbing control is then performed in this restricted movable range. This arrangement effectively ensures quick adjustment of the focus position of the video camera.

12 Claims, 7 Drawing Sheets

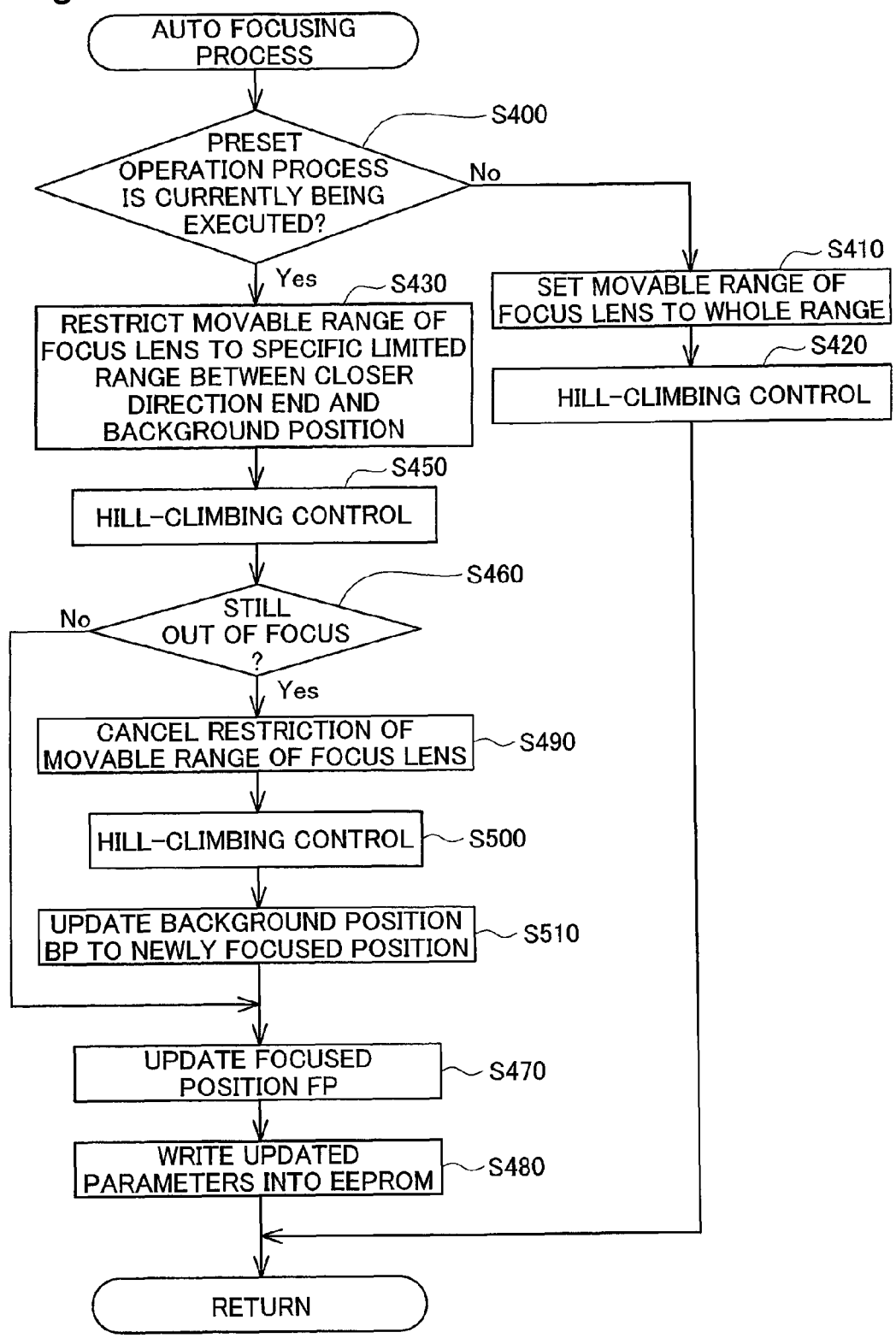

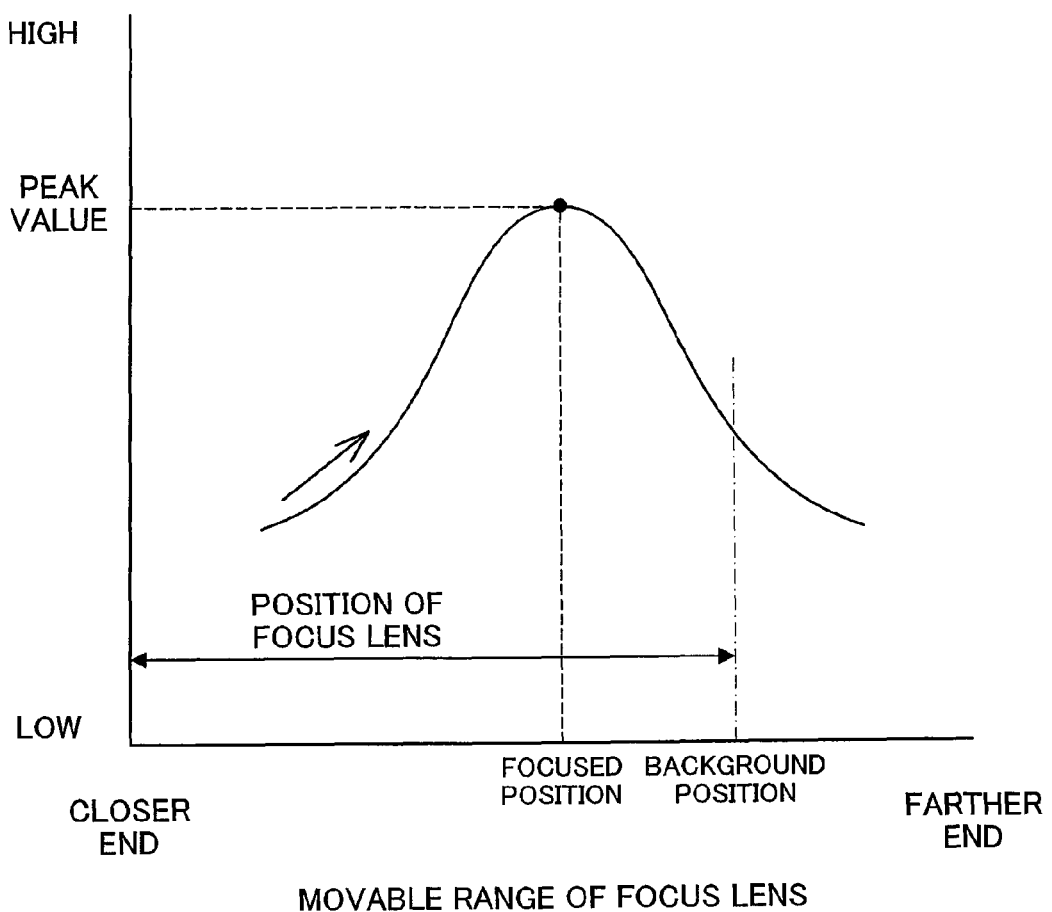

IMAGING DEVICE AND FOCUS ADJUSTMENT METHOD

CLAIM OF PRIORITY

The present application claims the priority based on Japanese Patent Applications No. 2007-458 filed on Jan. 5, 2007, the disclosures of which are hereby incorporated by reference in its entirety.

BACKGROUND

1. Technical Field

The present invention relates to a technology for automatically adjusting the focus of an imaging device.

2. Related Art

Some of conventional stationary cameras have the function of presetting various parameters representing the user's arbitrary settings, for example, a pan position, a tilt position, and a zoom magnification. The imaging direction of the stationary camera having this function is quickly changeable by simply reading out these preset parameters. After the change of the imaging direction, the position of a focus lens is adjusted to focus the camera on a subject.

Latest cameras generally have the auto focusing function to automatically adjust the focus. A typically adopted auto focusing control technique is hill-climbing control that moves a focus lens in a lens unit to maximize an evaluation value calculated from a high frequency component of a luminance value of a captured image (see, for example, Japanese Patent Laid-Open No. H07-87377 and No. H01-125065).

The hill-climbing control requires a relatively complicated series of processing to analyze the captured image with moving the focus lens, calculate the evaluation value from the high frequency component of the analyzed image, and detect the maximum of the calculated evaluation value. The hill-climbing control thus takes a relatively long processing time. Although the image direction of the camera is quickly changeable according to the preset parameters, the subsequent hill-climbing control takes time to adjust the position of the focus lens. The user may thus be uncomfortable with a response delay.

SUMMARY

By taking this problem arising from the hill-climbing control into consideration, there is a demand of enabling quick adjustment of the focus position after change of an imaging direction of a camera to a preset direction.

According to an aspect of the invention, there is provided an imaging device that captures an image of a subject via its optical system including a lens. The imaging device comprises: an imaging direction adjustment unit configured to adjust an imaging direction of the optical system; a focus regulation unit configured to regulate a characteristic value of the optical system to adjust a focus of the optical system; a preset value storage unit configured to store the adjusted imaging direction and the characteristic value in a focused state in the imaging direction, as preset values; a preset operation unit configured to read out the stored preset values at a predetermined timing, and adjust the imaging direction and regulate the characteristic value based on the read-out preset values; a restriction unit configured to restrict an adjustable range of the characteristic value to a specific range between the characteristic value stored as the preset value and a characteristic value corresponding to the focus in a close position; and a focusing control unit configured to perform focusing control that analyzes the image of the subject captured by the optical system while changing the regulated characteristic value in the restricted adjustable range, so as to focus the optical system on the subject.

After the adjustment of the imaging direction of the optical system and the regulation of the characteristic of the optical system based on the preset values, the imaging device according to this aspect of the invention restricts the adjustable range of the characteristic value of the optical system for the focusing control to the specific range between the characteristic value stored as the preset value and the characteristic value corresponding to the focus in the close position. In one possible example, the focused position according to the characteristic value stored as the preset value is located at a position of background wall or floor, and the subject is present between the background wall or floor and the imaging device. In this case, even under restriction of the adjustable range of the characteristic value for adjusting the focus, the arrangement of this imaging device quickly changes the characteristic of the lens in the restricted adjustable range to focus the lens. Namely restriction of the adjustable range of the characteristic value for adjusting the focus desirably shortens the time of the focusing control and enables quick focusing of the optical system on the subject.

In the imaging device according to one aspect of the invention, it is preferable that the focusing control unit configured to change the regulated characteristic value to make a high frequency component of the image captured by the optical system reach a peak value, so as to implement the focusing control. The predetermined timing of reading out the preset values is, for example, a timing of receiving the user's specific operation or a scheduled timing.

The technique of the invention is not restricted to the imaging device described above but may be actualized by diversity of other applications, for example, a focus adjustment method adopted in the imaging device and a computer program executed to attain the focus adjustment method.

These and other objects, features, aspects, and advantages of the invention will become more apparent from the following detailed description of the preferred embodiments with the accompanying drawings.

BRIEF DESCRIPTION OF THE DRAWINGS

FIG. 6 is a flowchart showing the details of an auto focusing process.

FIG. 7 visually shows the concept of a movable range of a focus lens.

DESCRIPTION OF THE PREFERRED EMBODIMENT

Figure 1:
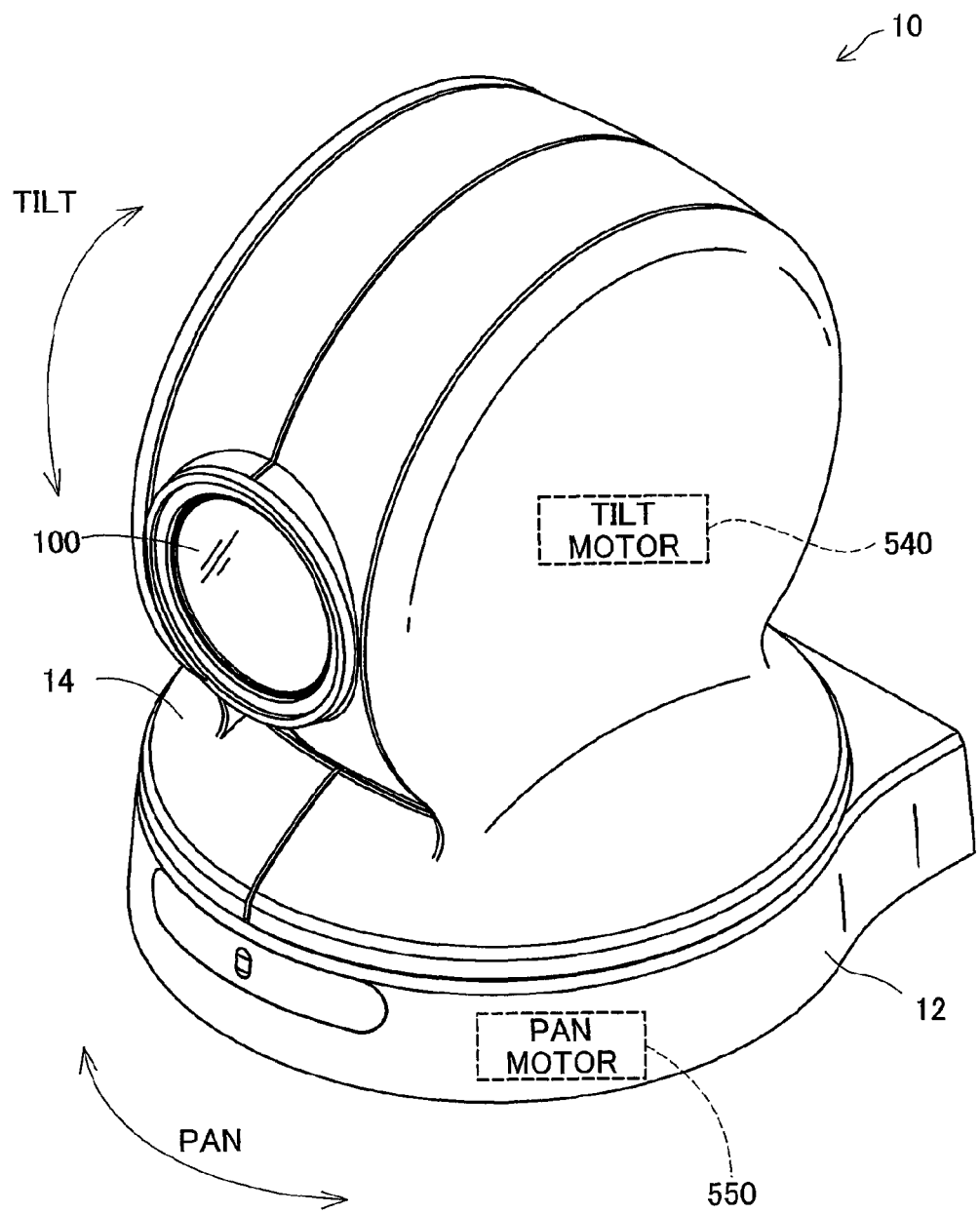
FIG. 1 shows the appearance of a video camera in one embodiment of the invention.

Some modes of carrying out the invention are described below in the following sequence with reference to the accompanied drawings:

A. Structure of Video Camera
B. Main Processing Flow
C. Preset Value Storage Process
D. Preset Operation Process
E. Auto Focusing Process
F. Other Aspects A. Structure of Video Camera:

FIG. 1 shows the appearance of a video camera 10 in one embodiment of the invention. The video camera 10 of the embodiment is a stationary type mounted, for example, on the table, the ceiling, or the wall and is used for security, monitoring, and diversity of other purposes.

As shown in FIG. 1, the video camera 10 has a base 12 mounted on an installation object, for example, the table, and a lens support frame 14 located above the base 12. The base 12 and the lens support frame 14 are connected by means of a pan motor 550 described later. The lens support frame 14 is rotated in a horizontal direction relative to the base 12 according to drive control of the pan motor 550. In the description below, the operation of moving the imaging direction of the video camera 10 in the horizontal direction is referred to as the 'pan operation'. The rear face of the base 12 is provided with an operation panel and an output terminal for outputting video signals of images captured by the video camera 10 to an external device.

The lens support frame 14 has left and right split side covers and a lens unit 100 located inside the split covers. The lens unit 100 is supported on the lens support frame 14 and is connected to a tilt motor 540. The lens unit 100 is rotated in a vertical direction according to drive control of the tilt motor 540. In the description below, the operation of moving the imaging direction of the video camera 10 in the vertical direction is referred to as the 'tilt operation'.

Figure 2:
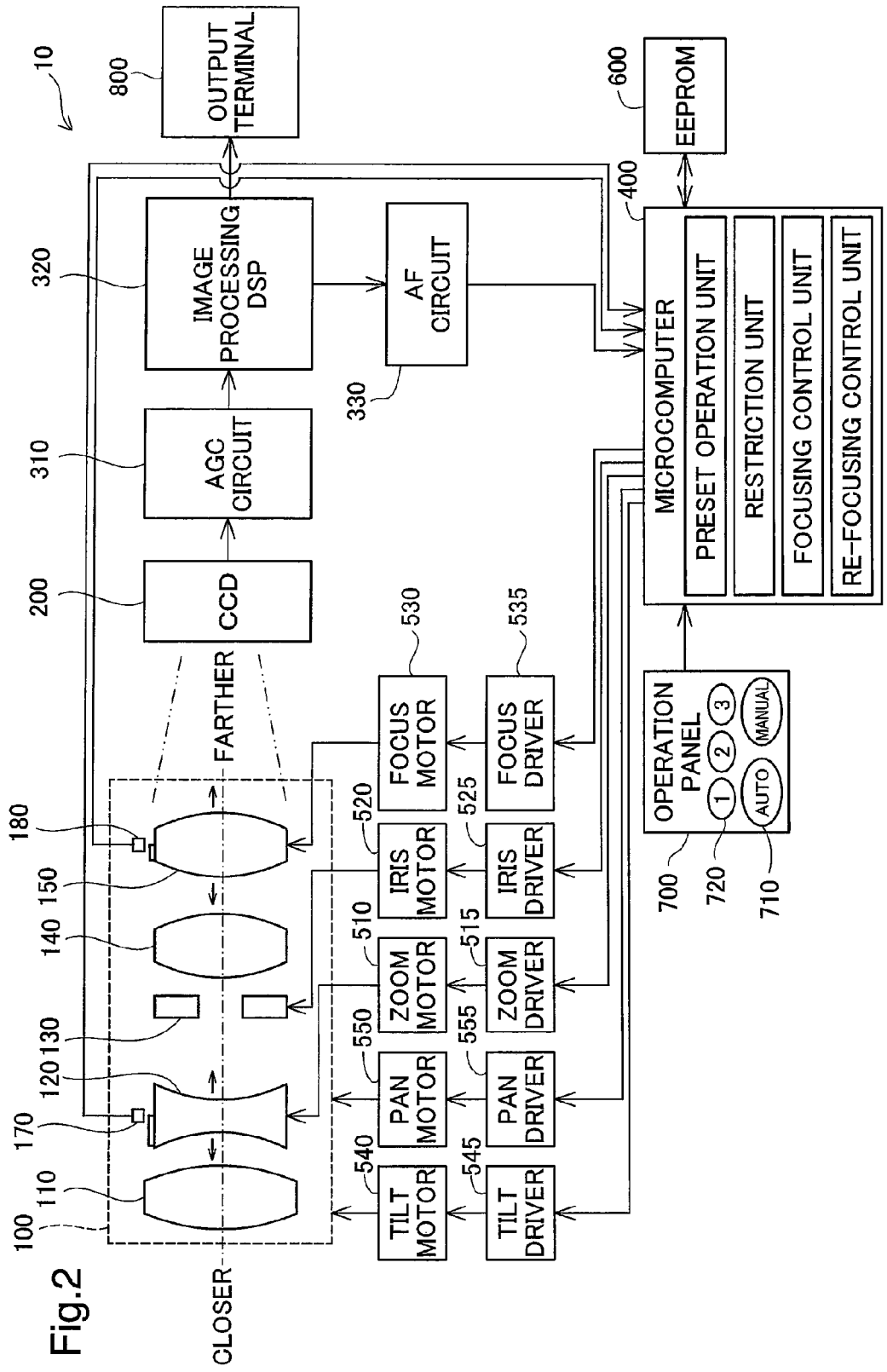
FIG. 2 is a block diagram showing the schematic structure of the video camera.

FIG. 2 is a block diagram showing the schematic structure of the video camera 10. As illustrated, the video camera 10 of the embodiment includes the lens unit 100, a CCD 200, an AGC circuit 310, an image processing DSP (digital signal processor) 320, an AF circuit 330, a microcomputer 400, an EEPROM 600, and an operation panel 700.

The lens unit 100 includes a first lens 110, a zoom lens 120, an iris mechanism 130, a third lens 140, and a focus lens 150, which are provided in this sequence from the subject closer side. The first lens 110 and the third lens 140 are fastened to be stationary in the lens unit 100. The zoom lens 120 is moved in the direction of an optical axis to vary the magnification. The iris mechanism 130 adjusts the quantity of light transmitted through the lens unit 100. The focus lens 150 is moved in the direction of the optical axis to adjust the focus position. In the description below, the direction of approaching to and focusing a subject is referred to as 'closer direction', whereas the direction of receding from the subject to infinity is referred to as 'farther direction'. In the lens unit 100 of the embodiment, the moving direction of the focus lens 150 toward the subject is the 'closer direction', and the moving direction of the focus lens 150 toward the CCD 200 is the 'farther direction' as shown in FIG. 2. In the lens unit of an inner focus type, the zoom lens and the focus lens may also be called 'variator lens' and 'compensator lens', respectively.

The zoom lens 120 is connected with a zoom motor 510 having a lead screw to move the zoom lens 120 back and forth in the direction of the optical axis. The zoom motor 510 is a stepping motor and is connected to the microcomputer 400 via a zoom driver 515 for driving the zoom motor 510. The zoom lens 120 is moved in the direction of the optical axis in the lens unit 100 to vary the magnification corresponding to the number of steps specified by the microcomputer 400.

The focus lens 150 is connected with a focus motor 530 having a lead screw to move the focus lens 150 back and forth in the direction of the optical axis. The focus motor 530 is a stepping motor and is connected to the microcomputer 400 via a focus driver 535 for driving the focus motor 530. The focus lens 150 is moved in the direction of the optical axis in the lens unit 100 to adjust the focus position corresponding to the number of steps specified by the microcomputer 400.

The iris mechanism 130 is connected with an iris motor 520 to adjust the aperture of the iris mechanism 130. The iris motor 520 is a galvanometer and is connected to the microcomputer 400 via an iris driver 525 for driving the iris motor 520. The iris mechanism 130 adjusts the quantity of light transmitted through the lens unit 100 in response to an instruction from the microcomputer 400. In the structure of this embodiment, the stepping motors are applied to the zoom motor 510 and the focus motor 530, and the galvanometer is applied to the iris motor 520. These are, however, not restrictive, but other type of motors, for example, dc motors, may be applied to the zoom motor 510, the focus motor 530, and the iris motor 520.

The video camera 10 is further equipped with the tilt motor 540 and the pan motor 550. The tilt motor 540 is connected to the microcomputer 400 via a tilt driver 545 for driving the tilt motor 540. Similarly the pan motor 550 is connected to the microcomputer 400 via a pan driver 555 for driving the pan motor 550. The microcomputer 400 controls these motors to freely vary the imaging direction of the video camera 10 for the tilt operation or the pan operation of the video camera 10 as shown in FIG. 1.

As mentioned previously, the zoom lens 120 and the focus lens 150 are moved in the direction of the optical axis in the lens unit 100. The lens unit 100 has a first origin sensor 170 and a second origin sensor 180 to detect whether the respective lenses 120 and 150 reach preset reference positions specified as their origins. The first origin sensor 170 and the second origin sensor 180 are constructed by photo interrupters and are connected to the microcomputer 400. The microcomputer 400 controls these origin sensors 170 and 180 to accurately adjust the position of the zoom lens 120 and the position of the focus lens 150.

The CCD 200 is an image sensor that receives the light transmitted through the lens unit 100 and converts the received light into an electric signal.

The AGC circuit 310 inputs the electric signal from the CCD 200 and amplifies the input electric signal to an adequate output level.

The image processing DSP 320 inputs the amplified electric signal from the AGC circuit 310 and performs A-D conversion of the input electric signal to generate image data. The image processing DSP 320 converts the generated image data into a composite video signal or an S video signal and outputs the video signal via an output terminal 800 to an external device, for example, a TV monitor or a picture recorder. The image processing DSP 320 also functions to extract a luminance signal from the image data generated by the A-D conversion and output the extracted luminance signal to the AF circuit 330. The image processing DSP 320 has diversity of other image processing functions, for example, gamma correction and aperture correction of the image data and white balance adjustment.

The AF circuit 330 has a circuit structure including a high pass filter, an absolute value circuit, a gate circuit, and a wave detector circuit. In response to input of the luminance signal from the image processing DSP 320 to the AF circuit 330, the high pass filter extracts a high frequency component from the input luminance signal, and the absolute value circuit specifies an absolute value of the extracted high frequency component. The gate circuit takes only a specific high frequency component in a preset distance range from the specified absolute value of the high frequency component. The wave detector circuit detects a wave peak of the specific high frequency component and generates an AF evaluation value. The generated AF evaluation value is output from the AF circuit 330 to the microcomputer 400. The higher AF evaluation value represents the better focus condition of the focus lens 150.

The operation panel 700 has a pan button, a tilt button, a zoom adjustment button, and a focus adjustment button and is connected to the microcomputer 400. In response to the user's operation of one of these buttons provided on the operation panel 700, an instruction corresponding to the operated button is transmitted to the microcomputer 400. The microcomputer 400 receives the transmitted instruction and controls the relevant motor, that is, the pan motor 550, the tilt motor 540, the zoom motor 510, or the focus motor 530 for the pan operation, the tilt operation, the zoom adjustment operation, or the focus adjustment operation.

The operation panel 700 also has a focus mode button 710. The user operates the focus mode button 710 to select a focus mode of the video camera 10 between an auto mode for automatic adjustment of the focus and a manual mode for manual adjustment of the focus. In response to the user's operation of the focus mode button 710 to set the auto focus mode, the microcomputer 400 sets the value '1' to a focus mode flag FL that is stored in an internal RAM. In response to the user's operation of the focus mode button 710 to set the manual focus mode, on the other hand, the microcomputer 400 sets the value '0' to the focus mode flag FL. In the subsequent processing described later, the microcomputer 400 refers to the setting of the focus mode flag FL to identify the current focus mode.

The operation panel 700 further has multiple preset buttons 720. The preset buttons 720 are operated to store the settings including the tilt position and the pan position into the video camera 10. In the structure of this embodiment, the operation panel 700 has three preset buttons 720 having preset numbers PN '1' to '3' allocated thereto.

In response to detection of the user's long press of one of the preset buttons 720 on the operation panel 700, the microcomputer 400 correlates various parameters, which represent the current settings including the pan position, the tilt position, the zoom lens position, the focus lens position, and the respective modes, to the preset number PN allocated to the long-pressed preset button 720, and stores the correlation into the EEPROM 600 in a non-volatile manner. The various parameters stored in the EEPROM 600 are referred to as 'preset values' in the following description. In the specification hereof, the 'user's long press' means that the user keeps pressing the preset button 720 for or over 2 seconds and then releases the preset button 720.

In response to detection of the user's short press of one of the preset buttons 720 on the operation panel 700, the microcomputer 400 reads out the preset values stored in correlation to the preset number PN allocated to the short-pressed preset button 720 from the EEPROM 600 and adjusts the pan position, the tilt position, the zoom lens position, the focus lens position, and the respective modes based on the read-out preset values. In the specification hereof, the 'user's short press' means that the user presses the preset button 720 and releases the pressed preset button 720 within 1 second.

The operation panel 700 has diversity of other buttons, for example, an exposure button for setting an exposure mode, a save button for storing a currently captured image as a still image, and various image processing buttons for performing image processing of the captured image. In the structure of this embodiment, the operation panel 700 is integrated with the video camera 10. In one possible modification, the operation panel 700 may be located at a distant position from the video camera 10 and connected with the video camera 10 via a predetermined communication path. In another possible modification, the operation panel 700 may be attached to an external device connected to the output terminal 800. The operation panel 700 may otherwise be constructed as a remote control that makes communication with the video camera 10 by means of infrared wave, ultrasonic wave, or any other wireless medium.

The microcomputer 400 controls the operations of the respective motors, for example, the tilt motor 540, the pan motor 550, the zoom motor 510, and the focus motor 530, in response to reception of the user's instruction through the operation of the operation panel 700.

The microcomputer 400 inputs the AF evaluation value from the AF circuit 330 and adjusts the focus position of the focus lens 150 corresponding to the input AF evaluation value. According to a concrete procedure, the microcomputer 400 wobbles the focus lens 150 in the direction of the optical axis and identifies the hill-climbing direction of the AF evaluation value based on a variation in input AF evaluation value. The microcomputer 400 continuously inputs the AF evaluation value with moving the focus lens 150 in the identified hill-climbing direction, specifies a peak position of the input AF evaluation value as a focused position, and moves the focus lens 150 to the specified focused position. In this manner, the microcomputer 400 automatically adjusts the focus position of the focus lens 150. This control procedure is well known in the art as 'hill-climbing control'. The microcomputer 400 of the embodiment corresponds to the 'preset operation unit', the 'restriction unit', and the 'focusing control unit' of the invention. The EEPROM 600 of the embodiment corresponds to the 'preset value storage unit' of the invention.

B. Main Processing Flow

Figure 3:
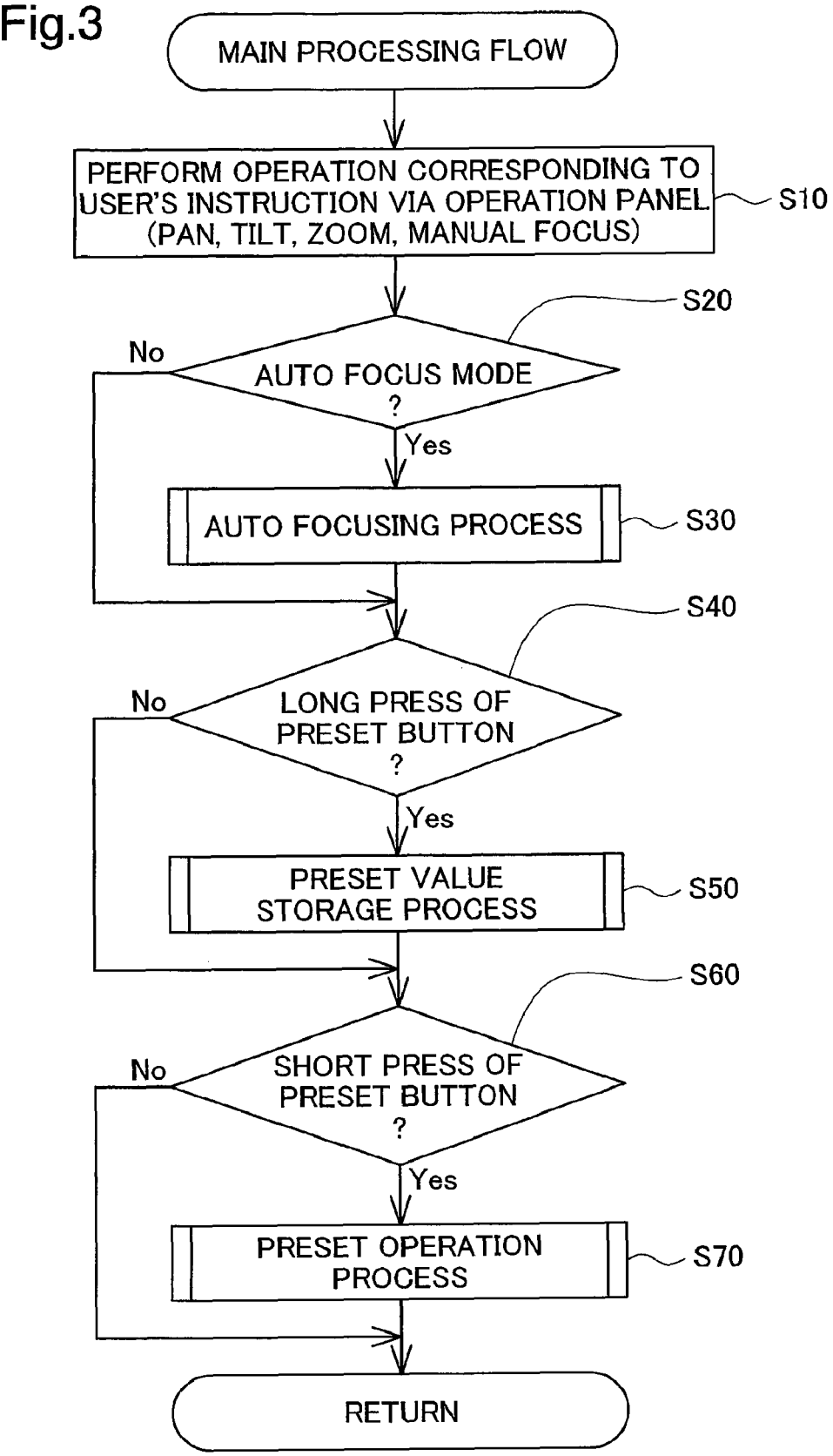
FIG. 3 is a flowchart showing a main processing flow executed in the video camera.

FIG. 3 is a flowchart showing a main processing flow constantly executed by the microcomputer 400 after every power-on of the video camera 10.

In the main processing flow of FIG. 3, the microcomputer 400 first inputs the user's instruction via the operation panel 700 and performs an operation corresponding to the input user's instruction (step S10). For example, in response to the user's press of the pan button, the microcomputer 400 controls the pan motor 550 for the pan operation of the video camera 10 in a specified direction. In response to the user's press of the tilt button, the microcomputer 400 controls the tilt motor 540 for the tilt operation of the video camera 10 in a specified angle. In response to the user's press of the zoom adjustment button, the microcomputer 400 controls the zoom motor 510 for adjustment of the zoom to a specified magnification. In response to the user's press of the focus adjustment button in the manual focus mode, the microcomputer 400 controls the focus motor 530 for focusing in a specified closer or farther direction.

The microcomputer 400 refers to the setting of the focus mode flag FL and identifies whether the focus mode set on the operation panel 700 is the auto mode (FL=1) (step S20). In response to the setting of the auto mode (FL=1), the microcomputer 400 performs an auto focusing process as described later (step S30). In response to the setting of the manual mode (FL=0), on the other hand, the auto focusing process of step S30 is skipped.

The microcomputer 400 subsequently detects the user's long press of any of the preset buttons 720 having the allocated preset numbers PN '1' to '3' (step S40). In response to the user's long press of one of the preset buttons 720, the microcomputer 400 performs a preset value storage process to correlate the various parameters representing the current settings including the pan position, the tilt position, the zoom lens position, the focus lens position, and the respective modes to the preset number PN allocated to the long-pressed preset button 720 and store the correlation into the EEPROM 600 (step S50). In the case of no long press of any of the preset buttons 720, on the other hand, the preset value storage process of step S50 is skipped. The preset value storage process will be described in detail later.

The microcomputer 400 then detects the user's short press of any of the preset buttons 720 having the allocated preset numbers PN '1' to '3' (step S60). In response to the user's short press of one of the preset buttons 720, the microcomputer 400 performs a preset operation process to read out the preset values stored in correlation to the preset number PN allocated to the short-pressed preset button 720 from the EEPROM 600 and adjust the pan position, the tilt position, the zoom lens position, the focus lens position, and the respective modes based on the read-out preset values (step S70). In the case of no short press of any of the preset buttons 720, on the other hand, the preset operation process of step S70 is skipped. The preset operation process will be described in detail later. This terminates the main processing flow. The microcomputer 400 repeatedly executes the above series of processing in the main processing flow of FIG. 3.

C. Preset Value Storage Process

Figure 4:
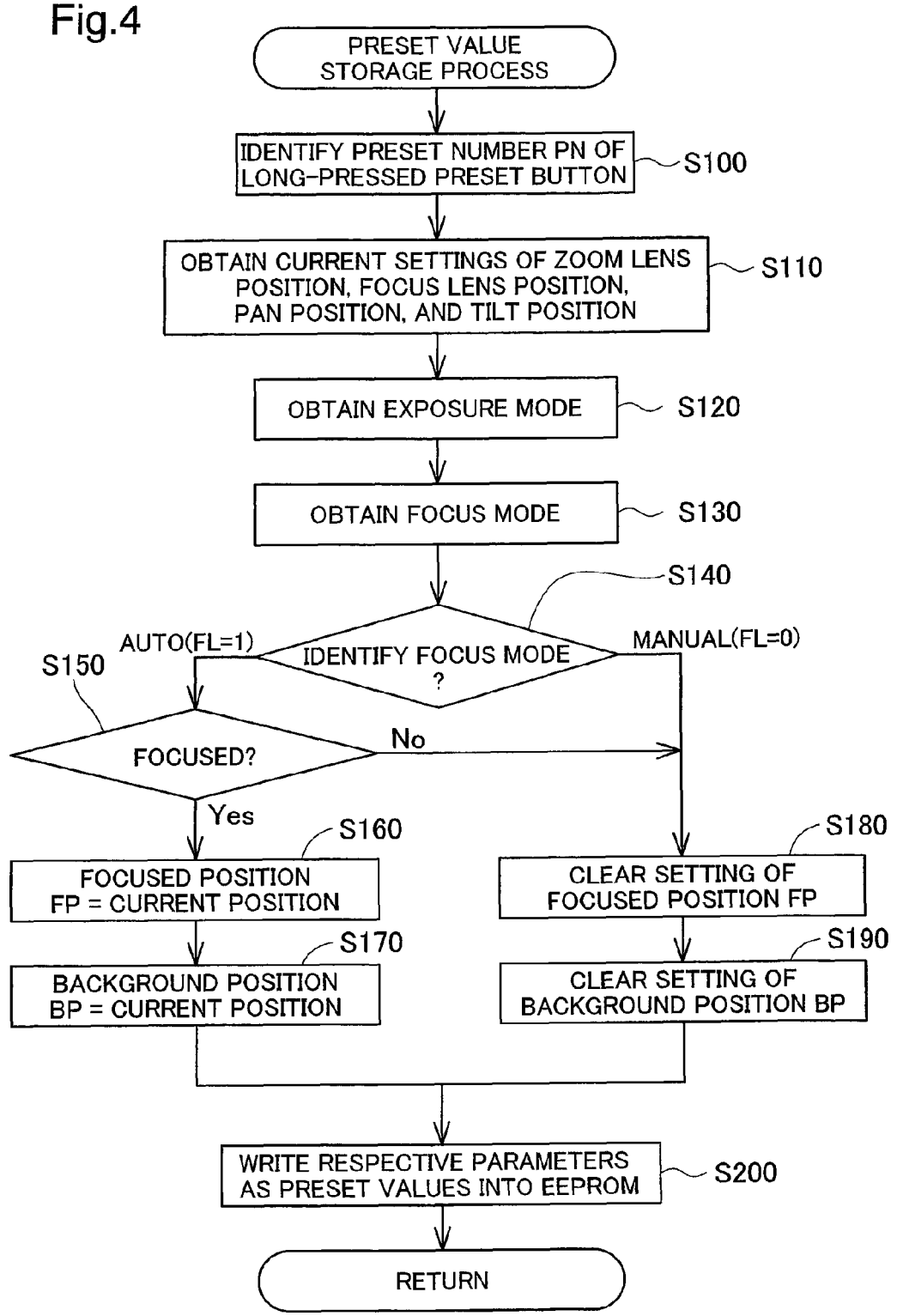
FIG. 4 is a flowchart showing the details of a preset value storage process.

FIG. 4 is a flowchart showing the details of the preset value storage process executed by the microcomputer 400 at step S50 in the main processing flow of FIG. 3. On the start of this preset value storage process, the microcomputer 400 first identifies the preset number PN of the long-pressed preset button 720 detected at step S40 in the main processing flow (step S100). The microcomputer 400 then obtains characteristic values of the optical system representing the current zoom lens position, the current focus lens position, the current pan position, and the current tilt position from the internal RAM (step S110). These parameters are stored in the internal RAM and are read out by the microcomputer 400 to control the operations of the zoom motor 510 and the other relevant motors.

The microcomputer 400 then obtains the current exposure mode (step S120), refers to the setting of the focus mode flag FL to obtain the current focus mode (step S130), and identifies whether the current focus mode is the auto mode or the manual mode (step S140).

When the identified focus mode is the auto mode (FL=1), the microcomputer 400 determines whether the focus lens 150 is currently focused or not (step S150). The concrete procedure of the determination of the focused state performs the known hill-climbing control to detect whether the AF evaluation value input from the AF circuit 330 reaches a peak value. When the input AF evaluation value reaches the peak value and it is accordingly determined that the focus lens 150 is currently focused (step S150: yes), the microcomputer 400 sets a 'focused position parameter FP' used for the subsequent auto focusing process (described later) to the current position of the focus lens 150 (step S160) and sets a 'background position parameter BP' used for the subsequent auto focusing process to the current position of the focus lens 150 (step S170).

When the identified focus mode is the manual mode (FL=0) (step S140) or when the input AF evaluation value does not reach the peak value and it is accordingly determined that the focus lens 150 is currently not focused (step S150: no), on the other hand, the microcomputer 400 clears the current settings of the focused position parameter FP and the background position parameter BP (steps S180 and S190).

The above series of processing obtains the current settings of the various parameters including the zoom lens position, the focus lens position, the pan position, the tilt position, the exposure mode, and the focus mode and also provides the focused position parameter FP and the background position parameter BP. The microcomputer 400 correlates the settings of these parameters as preset values to the preset number PN identified at step S100 and writes the correlation into the EEPROM 600 (step S200).

As described above, in response to the user's long press of one of the preset buttons 720 on the operation panel 700, the preset value storage process correlates the settings of the various parameters, for example, the imaging position of the video camera 10, the position of the zoom lens, and the position of the focus lens, to the preset number PN of the long-pressed preset button 720 and stores the correlation into the EEPROM 600.

D. Preset Operation Process

Figure 5:
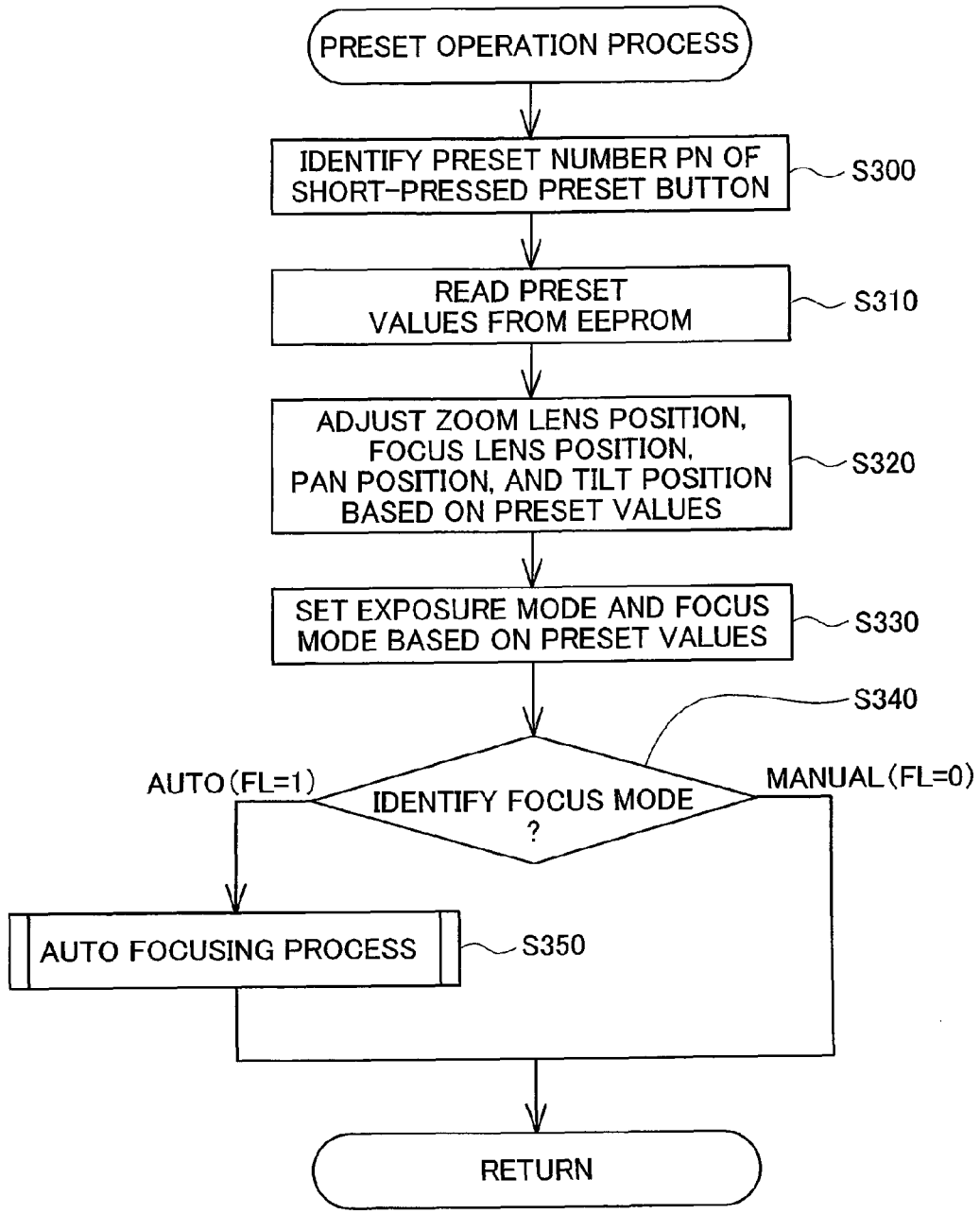
FIG. 5 is a flowchart showing the details of a preset operation process.

FIG. 5 is a flowchart showing the details of the preset operation process executed by the microcomputer 400 at step S70 in the main processing flow of FIG. 3. The preset operation process adjusts the pan position, the tilt position, the zoom lens position, the focus lens position, and the other related parameters, based on the preset values read out from the storage in the EEPROM 600.

On the start of this preset operation process, the microcomputer 400 first identifies the preset number PN of the short-pressed preset button 720 detected at step S60 in the main processing flow of FIG. 3 (step S300) and reads out the preset values corresponding to the identified preset number PN from the EEPROM 600 (step S310).

The microcomputer 400 controls the zoom motor 510 and the other relevant motors based on the preset values read out from the EEPROM 600 to adjust the zoom lens position, the pan position, and the tilt position and to move the focus lens 150 to a position specified by the focused position parameter FP (step S320). The focus lens 150 is not moved in the case of the cleared focused position parameter FP. The microcomputer 400 subsequently sets the exposure mode and the focus mode based on the read-out preset values (step S330).

The microcomputer 400 then identifies whether the focus mode set at step S330 is the auto mode or the manual mode (step S340). When the identified focus mode is the auto mode (FL=1), the microcomputer 400 performs the auto focusing process (described later) (step S350) and exits from this preset operation process. The auto focusing process enables the focus lens 150 moved to the previously focused position at step S320 to be accurately focused again. When the identified focus mode is the manual mode (FL=0), on the other hand, the microcomputer 400 exits from this preset operation process without performing the auto focusing process.

On execution of the auto focusing process at step S350, the microcomputer 400 sets a preset operation flag PF to the value '1', which represents that the microcomputer 400 is currently executing the preset operation process. On the return from the auto focusing process, the preset operation flag PF is reset to 0. It is readily determinable whether the auto focusing process is called from the preset operation process by simply referring to the setting of this preset operation flag PF.

As described above, the preset operation process readily moves the pan position, the tilt position, the zoom lens position, and the focus lens position to the user's favorite positions by simply reading out the preset values from the EEPROM 600.

E. Auto Focusing Process

FIG. 6 is a flowchart showing the details of the auto focusing process executed by the microcomputer 400 at either step S30 in the main processing flow of FIG. 3 or at step S350 in the preset operation process of FIG. 5. The auto focusing process is performed to automatically focus the focus lens 150 on the subject.

On the start of the auto focusing process, the microcomputer 400 first refers to the setting of the preset operation flag PF and determines whether the current cycle of the auto focusing process is called from the preset operation process (step S400). When the current cycle of the auto focusing process is not called from the preset operation process (step S400: no), the microcomputer 400 sets a movable range of the focus lens 150 to a whole range between a closer direction end and a farther direction end (step S410) and performs the hill-climbing control in this whole movable range to move the focus lens 150 to the focused position (step S420). This arrangement enables the focus lens 150 to be accurately focused on the subject in the course of the main processing flow. Here the terminologies 'closer position end' and 'farther position end' do not mean the actual ends of the lens unit 100 but represent respective ends in the movable range of the focus lens 150.

When the current cycle of the auto focusing process is called from the preset operation process (step S400: yes), on the other hand, the microcomputer 400 restricts the movable range of the focus lens 150 to a limited range between the closer position end and a lens position specified by the background position parameter BP (step S430) and performs the hill-climbing control of the focus lens 150 in this restricted movable range (step S450). In the cased of the cleared background position parameter BP, the movable range of the focus lens 150 is set to the whole range between the closer position end and the farther position end.

FIG. 7 visually shows the concept of the movable range of the focus lens 150. As illustrated, the focus lens 150 is movable in the whole range between the closer direction end and the farther direction end in the lens unit 100. When the current cycle of the auto focusing process is called from the preset operation process, the movable range of the focus lens 150 is restricted to the limited range between the closer direction end and the lens position specified by the background position parameter BP. The lens position specified by the background position parameter BP represents the previously focused position of the focus lens 150 in the preset value storage process. When no subject, such as a person, is present in the imaging direction, this lens position is a position focused on the background wall or floor (background position). The microcomputer 400 accordingly restricts the movable range of the focus lens 150 to the limited range between the closer direction end and the background position and performs the hill-climbing control in this restricted movable range. Such control enables quick focusing on a subject that is present between the background and the video camera 10.

The microcomputer 400 then determines whether the focus lens 150 is still out of focus as the result of the hill-climbing control in the restricted movable range executed at step S450 (step S460). When the focus lens 150 is in focus (step S460: no), the focused position parameter FP is updated to the focused position of the focus lens 150 (step S470) and writes the updated focused position parameter FP into the EEPROM 600 (step S480).

When the focus lens 150 is still out of focus in the restricted movable range between the closer direction end and the background position (step S460: yes), on the other hand, it is probable that the location of the video camera 10 is changed or that the layout of the background wall or floor is altered. The microcomputer 400 then cancels the restriction of the movable range of the focus lens 150 (step S490) and performs the hill-climbing control again in the whole range between the closer direction end and the farther direction end to focus the focus lens 150 (step S500). In this case, the microcomputer 400 performs the hill-climbing control with preference given to a previously excluded movable area that is out of the restricted movable range as the target of the first hill-climbing control.

On completion of the additional hill-climbing control, the microcomputer 400 updates the background position parameter BP to the newly focused position of the focus lens 150 as the result of this additional hill-climbing control (step S510) and updates the focused position parameter FP to the newly focused position of the focus lens 150 as the result of this additional hill-climbing control (step S470). Even in the event of a change of the location of the video camera 10 or even in the event of some layout change of the background, this arrangement enables such a change to be immediately reflected on the preset values. The microcomputer 400 writes the updated background position parameter BP and the updated focused position parameter FP into the EEPROM 600 (step S480) and exits from the auto focusing process.

As described above, when the auto focusing is performed in the course of the preset operation, the video camera 10 of the embodiment restricts the movable range of the focus lens 150 to the limited range between the closer direction end and the background position. This arrangement reduces the moving distance of the focus lens 150 and thereby enables quick high-climbing control in the course of the preset operation.

When the focus lens 150 fails to be focused in the restricted movable range due to a change of the location of the video camera 10 or some change of the layout of the background wall or floor, the auto focusing process of the embodiment cancels the restriction and performs the hill-climbing control again in the whole movable range. This arrangement ensures focusing of the focus lens 150 on the subject.

In the case of canceling the restriction of the movable range of the focus lens 150 and performing the hill-climbing control again, the auto focusing process of the embodiment performs the additional hill-climbing control with preference given to the previously excluded movable area that is out of the restricted movable range set as the target of the first hill-climbing control. This arrangement enables the quick focusing of the focus lens 150 on the subject.

The embodiment discussed above is to be considered in all aspects as illustrative and not restrictive. There may be many modifications, changes, and alterations without departing from the scope or spirit of the main characteristics of the present invention.

The embodiment regards the auto focus operation of the video camera 10. The control method of the embodiment is also applicable to the equivalent auto focusing operation of a still camera.

In the embodiment described above, the preset operation process is performed in response to the user's short press of one of the preset buttons 720. One possible modification may automatically perform the preset operation process at scheduled timings. In another modified structure, the video camera 10 may be equipped with an additional sensor for detecting any object entering the movable range of the video camera 10. The preset operation process may be performed in response to detection of an object by this sensor. Namely the preset operation process may be performed automatically at a predetermined timing set in the video camera 10, as well as in response to the user's explicit instruction.

F. Other Aspects

The invention may be embodied in the following aspects. For example, in one preferable application of the imaging device, the focus regulation unit regulates a position of the lens on an optical axis as the characteristic value of the optical system to adjust the focus of the optical system.

In the imaging device of this application, the focus position is adjustable by simply moving the position of the lens in the optical system. This arrangement thus enables quick adjustment of the focus. Another applicable technique for adjusting the focus in the optical system dynamically varies the thickness of a lens filled with a transparent gel substance to adjust the focus.

In one preferable structure, the imaging device further has a re-focusing control unit that, when the focusing control performed by the focusing control unit fails to focus the optical system in the restricted adjustable range, cancels the restriction and performs the focusing control again in the whole adjustable range.

When the optical system can not be focused on the subject in the restricted adjustable range, the imaging device of this preferable structure cancels the restriction and attains focusing of the optical system in the whole adjustable range of the characteristic value. Even in the case of some positional change of the background due to a layout change of background wall or floor or even in the case of a change of the location of the imaging device, this arrangement effectively enables the optical system to be focused on the subject as long as the change exceeds an allowable imaging area of the imaging device.

In the imaging device of this preferable structure, it is desirable that the re-focusing control unit performs the focusing control with preference given to the characteristic value in a previously excluded adjustable area other than the restricted adjustable range cut of the whole adjustable range.

The additional focusing control is performed with preference given to the previously excluded adjustable area other than the restricted adjustable range set as the target of the first focusing control. This arrangement desirably enables the optical system to be quickly focused on the subject.

In the imaging device of the above structure, when the optical system is newly focused in the whole adjustable range after cancellation of the restriction, the re-focusing control unit may update the preset value to the characteristic value at the newly focused position.

The imaging device of this arrangement stores the characteristic value at the newly focused position as the preset value. Even in the case of a change of the location of the imaging device or even in the case of some layout change of the background, this arrangement enables such a change to be immediately reflected on the preset value.

Although the present invention has been described and illustrated in detail, it is clearly understood that the same is by way of illustration and example only and is not to be taken byway of limitation, the spirit and scope of the present invention being limited only by the terms of the appended claims.

What is claimed is:

1. An imaging device that captures an image of a subject via its optical system including a lens, the imaging device comprising:

an imaging direction adjustment unit configured to adjust an imaging direction of the optical system;

a focus regulation unit configured to regulate a characteristic value of the optical system to adjust a focus of the optical system within a whole range defined between a close position and a far position;

a preset value storage unit configured to store the adjusted imaging direction and the characteristic value in a focused state in the imaging direction, as preset values;

a preset operation unit configured to read out the stored preset values at a predetermined timing, and adjust the imaging direction and regulate the characteristic value based on the read-out preset values;

a restriction unit configured to restrict an adjustable range of the characteristic value to a specific range comprising only a portion of said whole range, defined between the characteristic value stored as the preset value and a characteristic value corresponding to the focus in the close position; and an auto-focusing control unit configured to analyze the image of the subject captured by the optical system while changing the regulated characteristic value in the restricted adjustable range, so as to automatically focus the optical system on the subject.

2. The imaging device in accordance with claim 1, wherein the focus regulation unit regulates a position of the lens on an optical axis as the regulated characteristic value of the optical system.

3. The imaging device in accordance with claim 1, the imaging device further comprising:

a re-focusing control unit configured to, when the focusing control performed by the auto-focusing control unit fails to focus the optical system in the restricted adjustable range, cancel the restricted adjustable range and perform the focusing control again in the whole adjustable range.

4. The imaging device in accordance with claim 3, wherein the re-focusing control unit performs the focusing control with preference given to the characteristic value in a previously excluded adjustable area other than the restricted adjustable range out of the whole adjustable range.

5. The imaging device in accordance with claim 3, wherein when the optical system is newly focused in the whole adjustable range after cancellation of the restricted adjustable range, the re-focusing control unit updates the preset value to the characteristic value at the newly focused position.

6. The imaging device in accordance with claim 1, wherein the auto-focusing control unit changes the regulated characteristic value to make a high frequency component of the image captured by the optical system reach a peak value, so as to implement the focusing control.

7. A focus adjustment method that automatically adjusts a focus of an imaging device that captures an image of a subject via its optical system including a lens, the focus adjustment method comprising:

adjusting an imaging direction of the optical system;

regulating a characteristic value of the optical system to adjust the focus of the optical system within a whole range defined between a close position and a far position;

storing the adjusted imaging direction and the characteristic value in a focused state in the imaging direction, as preset values;

reading out the stored preset values at a predetermined timing, and adjusting the imaging direction and regulating the characteristic value based on the read-out preset values;

restricting an adjustable range of the characteristic value to a specific range comprising only a portion of said whole range, defined between the characteristic value stored as the preset value and a characteristic value corresponding to the focus in the close position; and performing auto-focusing control by analyzing the image of the subject captured by the optical system while changing the regulated characteristic value in the restricted adjustable range, so as to automatically focus the optical system on the subject.

8. The method in accordance with claim 7, wherein the focus regulation unit regulates a position of the lens on an optical axis as the regulated characteristic value of the optical system.

9. The method in accordance with claim 7, further comprising the step of re-focusing, when the auto-focusing step fails to focus the optical system in the restricted adjustable range, by canceling the restricted adjustable range and performing the auto-focusing control again in the whole adjustable range.

10. The method in accordance with claim 9, wherein the re-focusing step performs the auto-focusing control with preference given to the characteristic value in a previously excluded adjustable area other than the restricted adjustable range out of the whole adjustable range.

11. The method in accordance with claim 9, wherein, when the optical system is newly focused in the whole adjustable range after cancellation of the restricted adjustable range, the re-focusing control unit updates the preset value to the characteristic value at the newly focused position.

12. The method in accordance with claim 7, wherein the auto-focusing control step changes the regulated characteristic value to make a high frequency component of the image captured by the optical system reach a peak value, so as to implement the auto-focusing control.

* * * * *